Sept. 4, 1928.
J. H. GARTNER
TIRE PRESSURE INDICATOR
Filed Feb. 15, 1927
1,683,343
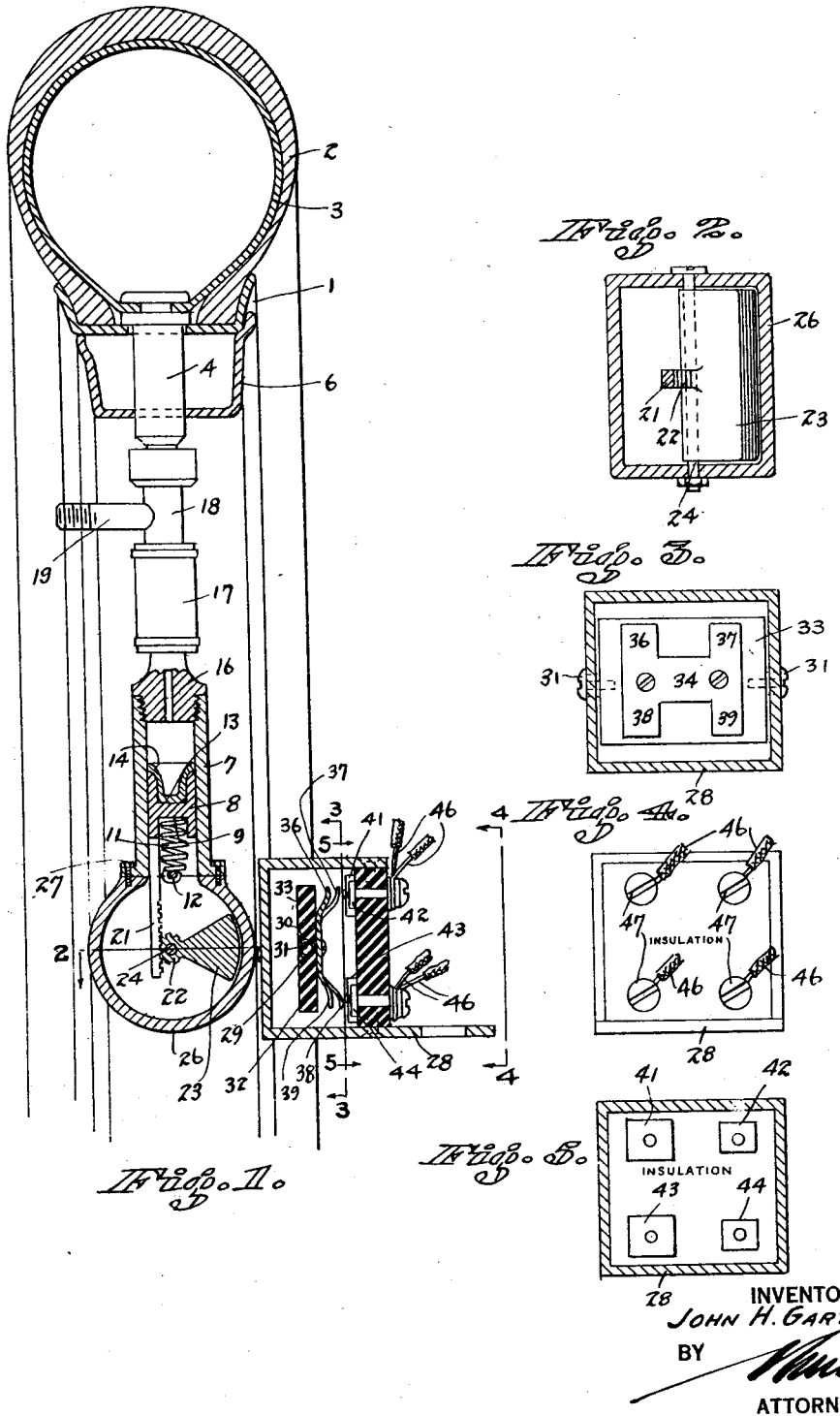
INVENTOR
JOHN H. GARTNER
BY
ATTORNEYS.

Patented Sept. 4, 1928.

1,683,343

UNITED STATES PATENT OFFICE.

JOHN H. GARTNER, OF SAN FRANCISCO, CALIFORNIA, ASSIGNOR OF ONE-FIFTH TO PATRICK S. HIGGINS, ONE-FIFTH TO JAMES D. SKELLY, AND ONE-FIFTH TO WILLIAM SHACKLETON.

TIRE-PRESSURE INDICATOR.

Application filed February 15, 1927. Serial No. 168,374.

The present invention relates to improvements in tire pressure indicators and has for its general object to visibly indicate to the driver of a motor vehicle while the car is in motion whether the tires are properly inflated. It is particularly proposed in this connection to provide a mechanism which allows four different signals to be given by a change in the tire pressure, two signals indicating lack of pressure and two other signals indicating over-inflation, the signals of each set becoming active at various degrees of over and under inflation.

The general scheme of this arrangement has been described in my co-pending application, Serial No. 165,021 filed Jan. 31, 1927 and is hereby referred to.

It is the particular object of the present invention to disclose a particular actuating means for a signalling scheme of the character described, and it is more particularly proposed to utilize magnetic means for rendering the signalling device active.

Further objects and advantages of my invention will appear as the specification proceeds.

The preferred form of my invention is illustrated in the accompanying drawing in which Figure 1 shows the general arrangement of my operating mechanism relative to the adjacent parts of a motor vehicle;

Figure 2 a section taken along line 2—2 of Figure 1;

Figure 3 a section taken along line 3—3 of Figure 1;

Figure 4 a side elevation as seen from line 4—4 of Figure 1; and

Figure 5 a section taken along line 3—3 but looking in the direction indicated by arrows 5—5.

While I have shown only the preferred form of the invention, it should be understood that various changes or modifications may be made within the scope of the claims hereto attached without departing from the spirit of the invention.

Referring to the drawing in detail, it will be seen that the rim 1 of a vehicle wheel carries the tire 2, which encloses the inner tube 3 provided with the conventional valve 4, extending through the rim 1 and the felly 6. A cylinder housing 7 is mounted preferably radially relative to the wheel and contains a piston 8, one face 9 of which is acted upon by a spring 11 held by a transverse pin 12. The other face 13 of the piston is formed with a pocket holding a rubber cup 14, the upper edges of which bear against the inner face of the cylinder for making an air tight seal. The upper end of the cylinder communicates through a threaded nipple 16, a flexible tube 17 and a universal valve 18, with the conventional valve 4 so that the chamber formed in the upper end of the cylinder is always subjected to the pressure prevailing within the tire. The universal valve 18 is of standard construction, its object being to open the passageway in the conventional valve 4, and to provide a side valve 19 through which the tire may be inflated.

The piston 8 has a rack rod 21 extending downwardly therefrom, and this rod actuates through a pinion 22 a magnetic body 23 pivotally supported, as shown at 24, the magnet being preferably enclosed in a housing 26 secured to the cylinder by bolts 27.

Fixed to a stationary part of the motor vehicle is a casing 28 having an armature 29 pivoted therein, as shown at 31. The armature is pivoted centrally and provides two arms 32 and 33 and is normally held in a plane parallel to the plane of the wheel, the pivot 31 being equi-distant from the axis of rotation with the pivot 24, and being arranged so that the armature occupies a radial position. The armature has a spring member 34 secured thereto, which presents four different spring contacts 36, 37, 38, and 39, the former two extending outwardly from the pivot 31 and the latter two extending inwardly, and the four contacts being adapted for engagement with four stationary contacts 41, 42, 43, and 44 connecting through four wires 46 with circuits, not shown in the present drawing but described and illustrated in the co-pending application. Screws 47 hold the wires 46 in place. A spring 30 holds the armature in normal position.

The operation of my device is as follows: When the pressure in the tire is normal the piston 8 retains the position indicated in Figure 1, so that the magnet occupies an exact midway position, and when passing the armature 29 draws on both arms thereof with equal force so as to leave the armature unaffected. When the pressure in the tire changes and decreases the spring 11 forces the piston upward, whereby the magnet 23 is swung downwardly and now becomes active upon the inner arm 32 of the armature when passing the same. The inner arm 32 being attracted, the outer contact 37 engages with the stationary contact 41 and closes a circuit, indicating to the driver through some suitable signal, as for instance, the lighting of a lamp, that the pressure in the tire runs low. As the pressure still further decreases the second contact 36 engages the contact 42, thereby closing a second circuit and lighting a second lamp, indicating to the driver that the tire is further reduced in pressure, the arrangement being preferably adjusted in such a manner that the first signal becomes active before the pressure is reduced to such an extent that it would be dangerous to continue driving, while the second signal becomes active when the tire is flat.

On an increase in pressure the magnet 23 becomes active on the upper arm 33 of the armature and successively engages contacts 38 and 44 and the contacts 39 and 43 for similarly stepwise indicating increase in pressure.

I claim:

1. In a pressure indicator for a pneumatic tire, a movable magnetic element revolving with the tire, means for moving the same in response to changes in the tire pressure, and an alarm device having an operating member mounted in operative proximity of the tire so as to be periodically passed by the magnetic element and to be subject to the influence thereof, the operating member and the magnetic element being arranged relative to one another so that the latter is responsive to the former only when the magnetic element is moved to an abnormal position due to an abnormal change in the tire pressure.

2. In a pressure indicator for a pneumatic tire, a movable magnetic element revolving with the tire, means for moving the same in response to changes in the tire pressure, and an electric circuit having a switch element mounted in operative proximity of the tire so as to be periodically passed by the magnetic element, and to be subject to the influence thereof, the switch element and the magnetic element being arranged relative to one another so that the latter is responsive to the former only when the magnetic element is moved to an abnormal position due to an abnormal change in the tire pressure.

3. In a pressure indicator for a pneumatic tire, a movable magnetic element revolving with the tire, means for moving the same in response to changes in the tire pressure, and an electric circuit having a switch element mounted in operative proximity of the tire so as to be periodically passed by the magnetic element and to be subject to the influence thereof, the switch element being a pivoted lever and the magnetic element being mounted so as to normally pass the fulcrum thereof and to leave the lever unaffected but to move in the direction of one of the arms of the lever under the influence of a change in the tire pressure for operating the said arm.

4. In a pressure indicator for a pneumatic tire, a movable magnetic element revolving with the tire, means for moving the same in response to changes in the tire pressure, and an electric circuit having a switch element mounted in operative proximity of the tire so as to be periodically passed by the magnetic element and to be subject to the influence thereof, the switch element being a pivoted lever and the magnetic element being mounted relative thereto so as to normally leave the switch element unaffected but to operate the same when its position is changed due to a change in the tire pressure.

JOHN H. GARTNER